United States Patent

Tsai

[11] Patent Number: 6,043,476
[45] Date of Patent: Mar. 28, 2000

[54] FILM SCANNER WITH AN ADJUSTABLE LIGHT SOURCE FOR SCANNING POSITIVE OR NEGATIVE FILMS

[75] Inventor: Chi-Pin Tsai, Hsinchu, Taiwan

[73] Assignee: Microtek International Inc., Hsinchu, Taiwan

[21] Appl. No.: 09/089,935

[22] Filed: Jun. 3, 1998

[51] Int. Cl.[7] ............................................ G01J 1/32

[52] U.S. Cl. ........................... 250/205; 250/226; 348/97

[58] Field of Search .................................. 250/205, 226; 348/97, 96, 101, 109; 358/516, 518; 347/232; 362/16, 18

[56] References Cited

U.S. PATENT DOCUMENTS 5,528,288  6/1996  Sandor et al. ............................ 348/97

Primary Examiner—Que T. Le

[57] ABSTRACT

The present invention provides a film scanner with an adjustable light module whose chromaticity can be adjusted according to the positive or negative film to be scanned. The film scanner comprises a light module comprising a plurality of lamps of different colors, a scanning module for scanning the light transmitted through the film and generating image signals, an adjusting device for adjusting the on/off state or chromaticity of the lamps, and a control device for controlling the adjusting device according to the image signals received from the scanning module.

9 Claims, 4 Drawing Sheets

FILM SCANNER WITH AN ADJUSTABLE LIGHT SOURCE FOR SCANNING POSITIVE OR NEGATIVE FILMS

BACKGROUND OF THE INVENTION

1. Field of the Invention

The present invention relates to a film scanner, and more particularly, to a film scanner with an adjustable light source whose chromaticity can be adjusted according to the film to be scanned.

2. Description of the Prior Art

As film scanners have assumed an increasingly important role in graphic image processing, users have realized the importance of scanners with high image quality, demanding both image clarity and true color representation. Obviously, the color character of scanned films is an important consideration when choosing parts affecting the color output of a film scanner.

In general, there are two types of films used in film scanners: positive films and negative films. Please refer to FIG.1 and FIG. 2. FIG. 1 shows a transmitted spectrum generated by fully exposed positive films. FIG. 2 shows a transmitted spectrum generated by unexposed negative films. As can be seen from FIG. 1 and FIG. 2, the ratio of the spectrum distribution of transmitted rate (or absorption rate) for positive films is vastly differently from that of negative films, i.e., the transmitted rate $R_{650}:G_{540}:B_{450}$ of exposed positive films under a standard light is about 1:1:1, and that of unexposed negative films is about 4.0:1.3:1.0. This indicates that there is an even transmitted rate for red, green, and blue colors on positive films but a significantly higher transmitted rate for red on negative films. Therefore, under the same illuminating conditions and duration, positive films will display balanced chromaticity while negative films will display an unbalanced chromaticity with a higher brightness of red.

To overcome the problem of the difference of transmitted rate between positive and negative films, most film scanners are provided with a color scanner module having shutter function. The shutter function adjusts the exposure time for red, green, and blue colors creating balanced chromaticity of scanned images. Unfortunately, the shutter function makes color scanning modules costly, takes more exposure time, and thus slows down scanning speed.

SUMMARY OF THE INVENTION

It is therefore a primary objective of the present invention to provide a film scanner with an adjustable light to solve the above mentioned problems.

In a preferred embodiment, the present invention provides a film scanner comprising:

a light module for generating light for a film;

a color scanning module for scanning the light transmitted through the film to generate color image signals comprising red, green, and blue colors;

a control device electrically connected to the color scanning module for receiving the image signals generated by the color scanning module; and an adjusting device electrically connected to the light module and the control device for adjusting the chromaticity of the light generated by the light module under the control of the control device.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
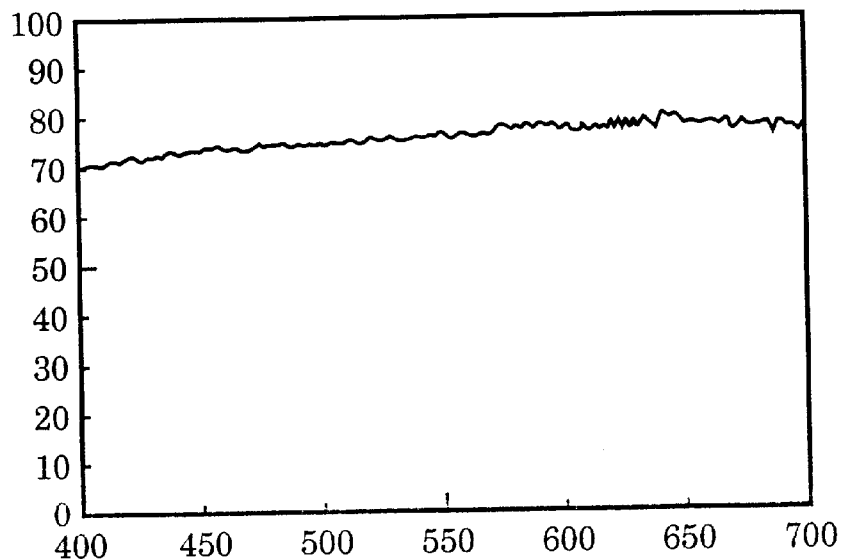
FIG. 1 a transmitted spectrum of exposed positive films.
Figure 2:
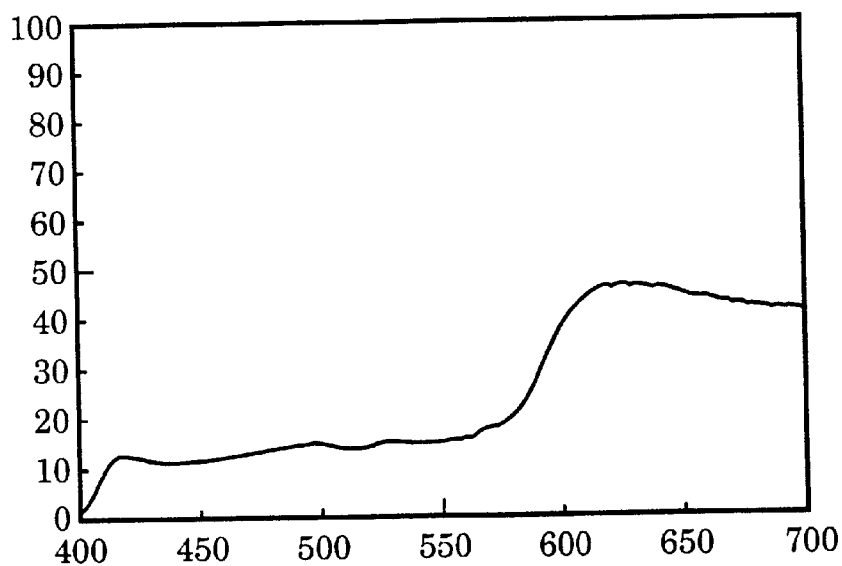
FIG. 2 is transmitted spectrum of unexposed negative films.
Figure 3:
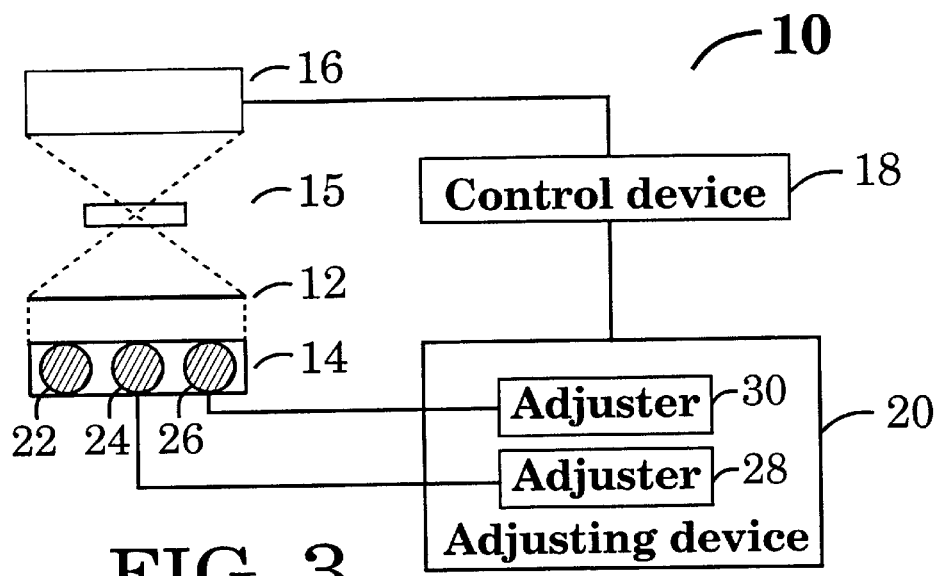
FIG. 3 is a schematic diagram of a film scanner with three lamps according to the present invention.

Please refer to FIG. 3. FIG. 3 is a schematic diagram of a film scanner 10 with three lamps according to the present invention. The film scanner 10 comprises a light module 14 for illuminating a film 12, a color scanning module 16 for scanning the light transmitted through the film 12 to generate color image signals comprising red, green, and blue color components, a lens module 15 for focusing the light transmitted through the film 12 onto the scanning module 16, a control device 18 electrically connected to the scanning module 16 for receiving the image signals from the scanning module 16, and an adjusting device 20 electrically connected to the light module 14 and the control device 18 for adjusting the light generated by the light module 14 under the control of the control device 18. The light module 14 comprises red, green, and blue colored lamps 22, 24 and 26. The adjusting device 20 comprises two adjusters 28 and 30, one connected to the green lamp 24 and the other connected to the blue lamp 26 for controlling the on/off state or the brightness of these two lamps. The adjusting device 20 can make the light module 14 generate different combinations of red and blue lights under direction of the control device 18. Thus, the film scanner 10 can generate image signals of balanced chromaticity regardless of whether positive or negative films are scanned.

Figure 4:
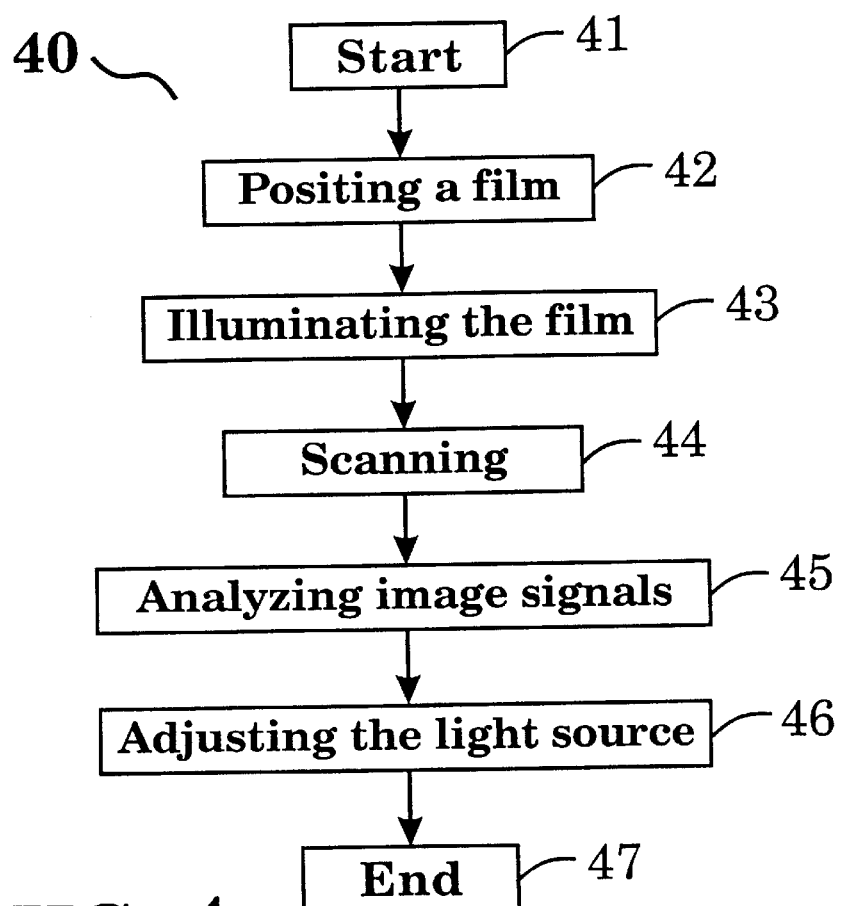
FIG. 4 is a flowchart for adjusting the light in the film scanner shown in FIG. 3.

Please refer to FIG. 4. FIG. 4 is a flowchart 40 for adjusting the light of the film scanner 10 shown in FIG. 3. It comprises the following steps:

step41: start;

step42: positioning the film 12 at the scanning position on the film scanner 10;

step43: illuminating the film 12 with light of predetermined chromaticity and brightness using the light device 14;

step44: scanning the light transmitted through the film 12 and outputting color image signals to the control device 18 using the scanning module 16;

step45: analyzing the received image signals for chromaticity balance and activating the adjusting device 20 to adjust the light under direction of the control device 18;

step46: adjusting the on/off state or brightness of the green lamp 24 and blue lamp 26 using the adjusting device 20 to modify the chromaticity balance;

step47: end.

The control device 18 of the film scanner 10 may use an alternate method for achieving chromaticity balance besides using the analysis procedure. In the manufacturing of the film scanner 10, information necessary for chromaticity balance such as brand or type of popularly used films or the required brightness level of each colored lamp for each kind of film is built into the control device 18. While scanning a film, the user inputs the brand and type of film used. This information is used by the control device to determine the appropriate brightness necessary for the film in order to achieve chromaticity balance through use of the adjusting device 20.

Figure 5:
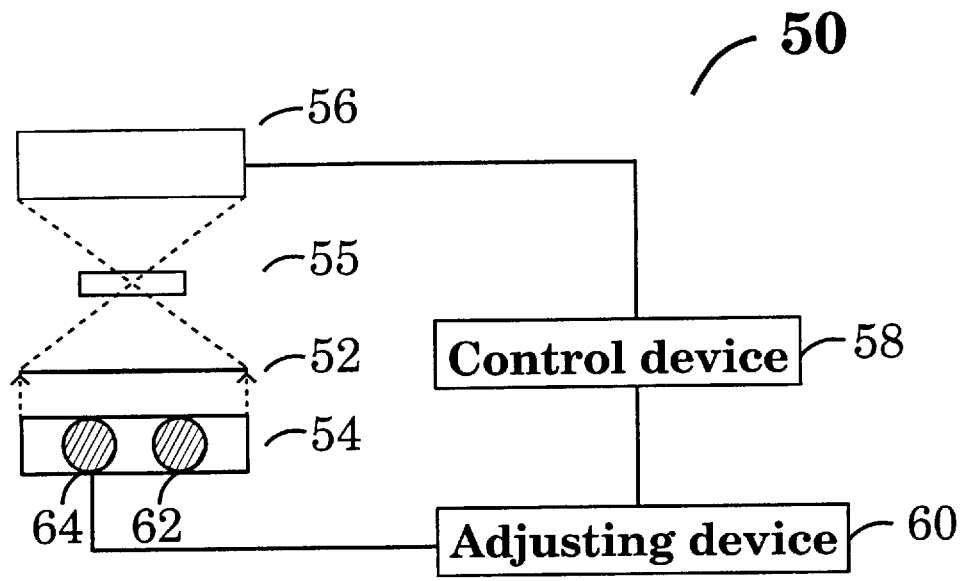
FIG. 5 is a schematic diagram of a film scanner with two lamps according to the present invention.

Please refer to FIG. 5. FIG. 5 is a schematic diagram of a film scanner 50 with two lamps according to the present invention. The film scanner 50 comprises a light module 54 for illuminating a film 52, a color scanning module 56 for scanning the light transmitted through the film 52 to generate color image signals comprising red, green, and blue color components, a lens module 55 for focusing the light transmitted through the film 52 onto the scanning module 56, a control device 58 electrically connected to the scanning module 56 for receiving the image signals from the scanning module 56, and an adjusting device 60 electrically connected to the light module 54 and the control device 58 for receiving signals from the control device 58 and then adjusting the light module 54 accordingly. The light module 54 comprises an unadjustable positive film lamp 62 for providing light with chromaticity and brightness appropriate for positive films, and a brightness adjustable lamp 64 whose chromaticity differs from that of the positive film lamp 62 and can, in conjunction with the positive film lamp 62, provide light with various chromaticity and brightness.

If the film 52 is a positive film, the control device 58 will turn off the lamp 64 and turn on the positive film lamp 62 causing the light module 54 to provide the light appropriate for the positive film 52. If the film 52 is a negative film, the control device 58 will turn on the positive film lamp 62 and execute an analysis procedure similar to that mentioned in FIG. 5 to adjust the brightness of the lamp 64 thereby generating appropriate light for the negative film 52.

Figure 6:
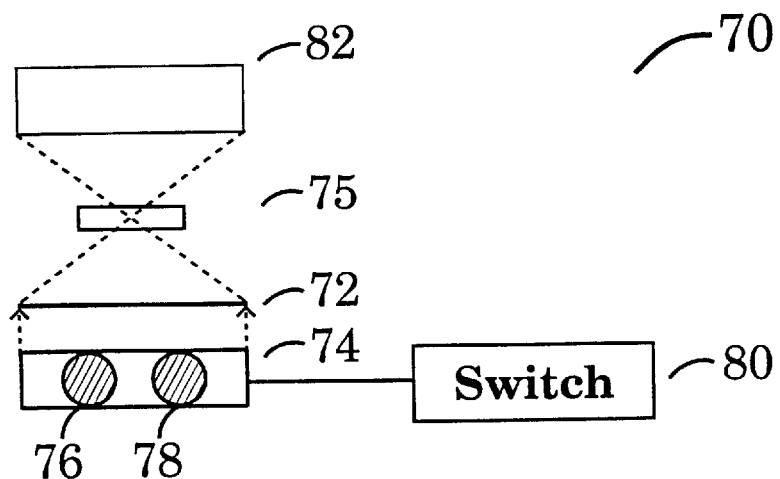
FIG. 6 is a schematic diagram of another embodiment of a film scanner with two lamps.

Please refer to FIG. 6. FIG. 6 is a schematic diagram of another embodiment of a film scanner 70 with two lamps. The film scanner 70 comprises a light module 74 for illuminating a film 72, a color scanning module 82 for scanning the light transmitted through the film 72 to generate image signals consisting red, green, and blue color components, a lens module 75 for focusing the light transmitted through the film 72 onto the scanning module 82, and a switch 80 electrically connected to the light module 74 for switching the light module 74. The light module 74 comprises a positive film lamp 76 and a negative film lamp 78. The positive film lamp 76 has chromaticity and brightness applicable to positive films, and the negative film lamp 78 has those applicable to negative films. When the film 74 is a positive film, the positive film lamp 76 is turned on and the negative film lamp 78 is turned off through the switch 80 allowing the light module 72 to generate light appropriate for the positive film 74. When the film 74 is a negative film, the switch 80 turns on the negative film lamp 78 and turns off the positive film lamp 76 making the light module 72 generate light appropriate for the negative film 74.

In the above mentioned embodiment, by using the switch 80, a user may choose to turn on only the negative film lamp 78 or to turn on both the positive film lamp 76 and the negative film lamp 78 while scanning a negative film.

Figure 7:
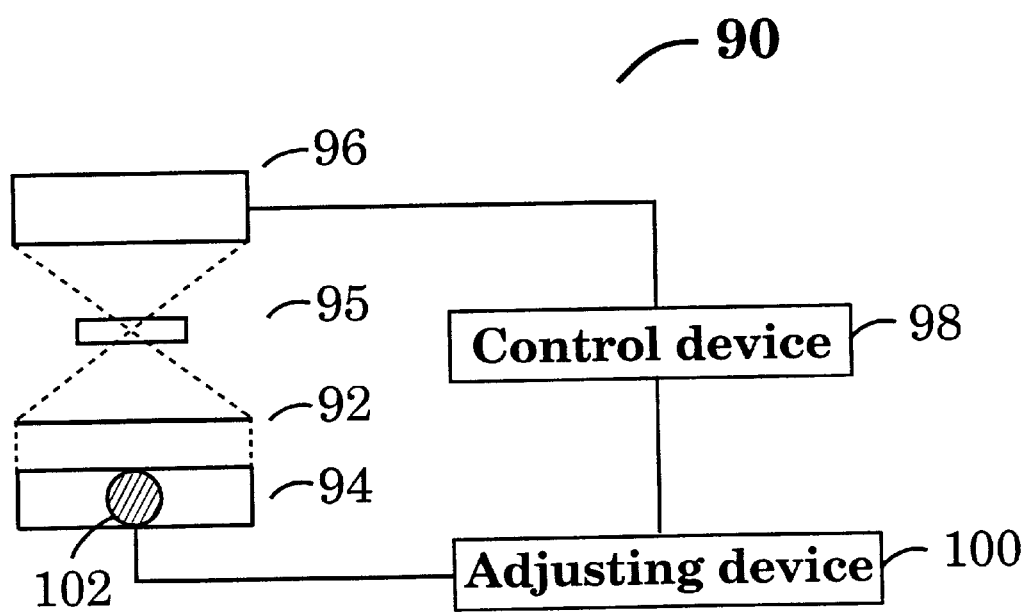
FIG. 7 is a schematic diagram of a film scanner with a lamp according to the present invention.

The present invention can also use a lamp together with an adjusting device to achieve adjustable light function. Please refer to FIG. 7. FIG. 7 is a schematic diagram of a film scanner 90 with a lamp according to the present invention. The film scanner 90 comprises a light module 94 for illuminating a film 92, a color scanning module 96 for scanning the light transmitted through the film 92 to generate color image signals comprising red, green, and blue color components, a lens module 95 for focusing the light transmitted through the film 92 onto the scanning module 96, a control device 98 electrically connected to the scanning module 96 for receiving the image signals from the scanning module 96, and an adjusting device 100 electrically connected to the light module 94 and the control device 98 for adjusting the light module 94 under the control of the control device 94. The light module 94 comprises a lamp 102. The varied output of the adjusting device 100 enables the light module 94 to generate lights with different brightness according to the signals from the control device 98. Thus, the film scanner 90 can have image signals with balanced chromaticity regardless of whether positive or negative films are scanned.

The film scanners 10, 50, 70, and 90 of the present invention respectively use three lamps, two lamps, two lamps and one lamp to provide light appropriate for positive films and negative films and to achieve a balanced chromaticity effect. The film scanners of the present invention do not use the CCD shutter function of the prior art film scanner to achieve chromaticity balance. Therefore, scanning time and cost of the scanning module are reduced.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A scanner for scanning a film comprising:

a light module for generating light for a film;

a scanning module for scanning the light transmitted through the film to generate image signals;

a control device electrically connected to the scanning module for receiving the image signals from the scanning module; and an adjusting device for adjusting the chromaticity balance of the light generated by the light module and allowing the scanning module to effectively scan different types of films.

2. The scanner of claim 1, wherein the scanning module is a color scanning module and the image signals generated by the color scanning module are color image signals comprising red, green, and blue color components.

3. The scanner of claim 1, wherein the control device and adjusting device are electrically connected and the control device controls the adjusting device to adjust light generated by the light module.

4. The scanner of claim 3, wherein the control device controls the adjusting device according to the image signals generated by the scanning module to adjust the light generated by the light module.

5. The scanner of claim 3, wherein the light module comprises at least one lamp and the control device controls the on/off state or brightness of each of the lamps to adjust the light generated by the light module.

6. The scanner of claim 5, wherein the film can be a positive film or a negative film, and wherein the light module comprises a positive film lamp and a negative film lamp for illuminating the positive or negative film respectively.

7. The scanner of claim 6, wherein the control device can use the negative lamp alone or the positive and negative lamps together to illuminate the negative film.

8. The light of claim 5, wherein the light module comprises red, green, and blue lamps to generate different combinations of colored lights.

9. The scanner of claim 1, wherein the adjusting device is a switch for altering the light generated by the light module.

* * * * *